Patented July 7, 1942

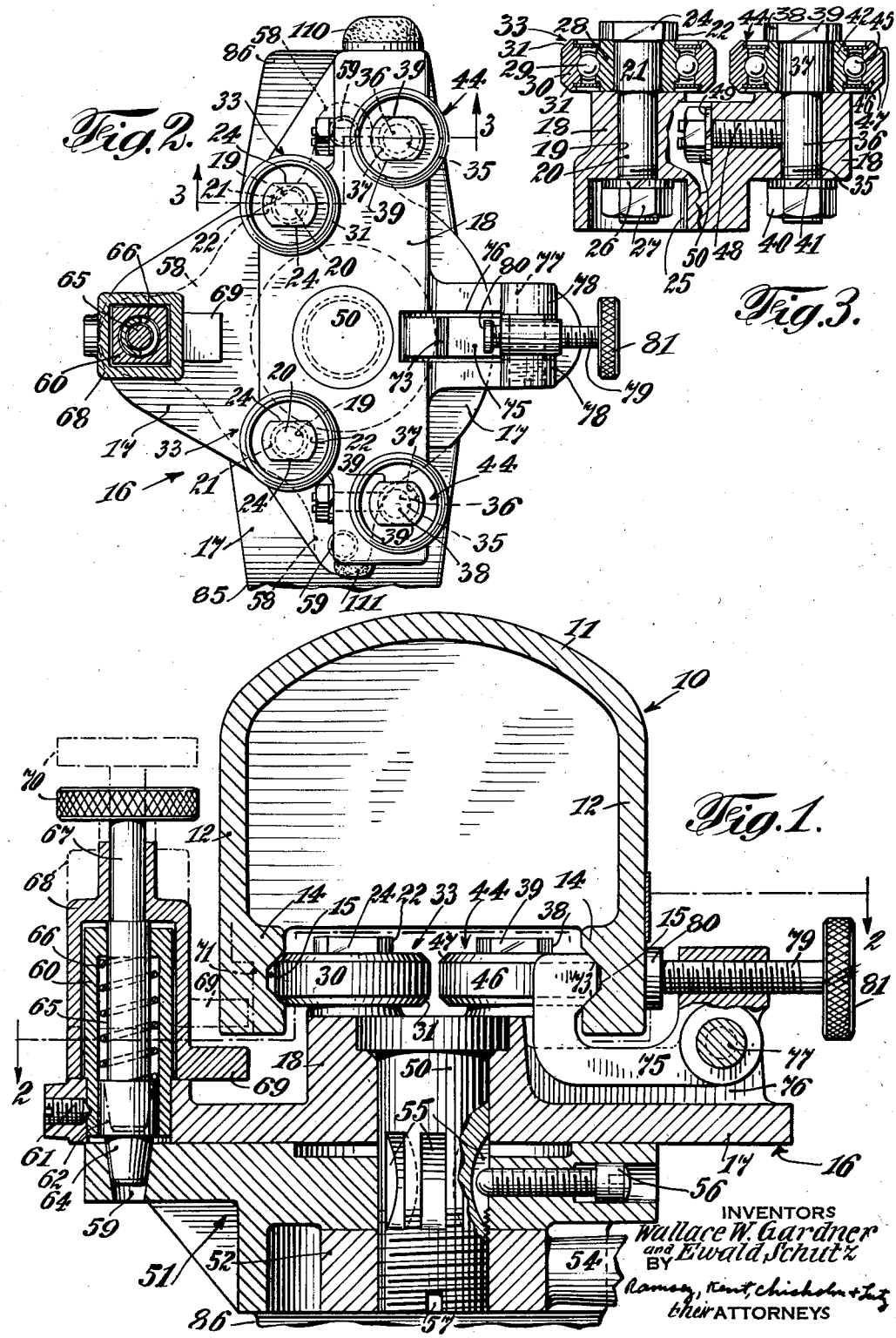

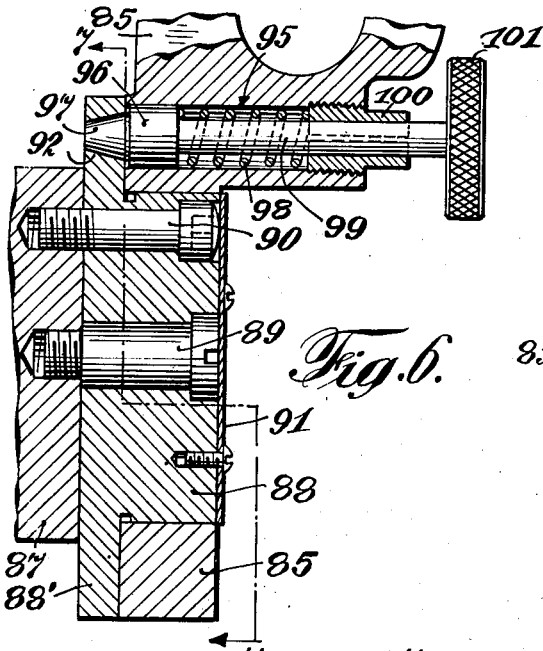
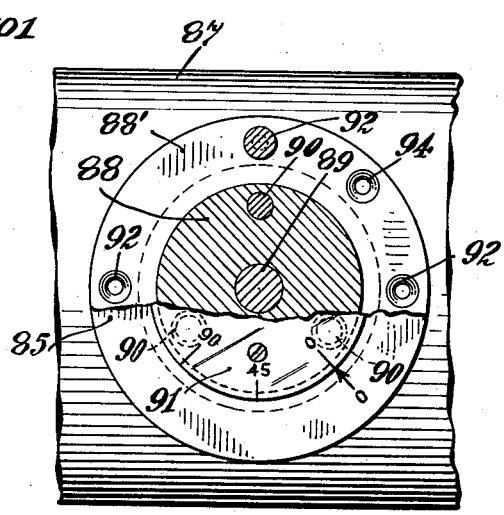
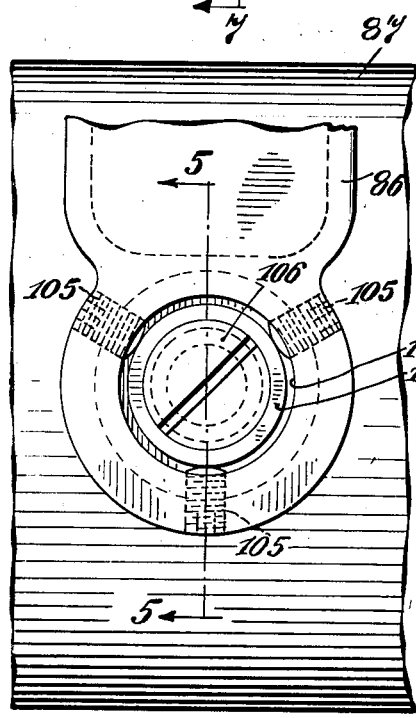
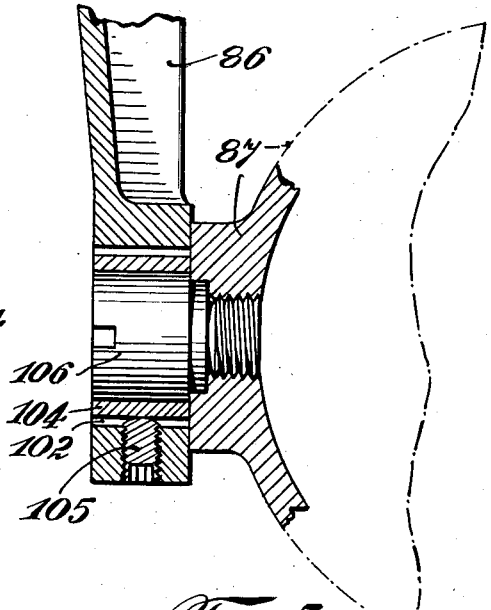

2,289,259

UNITED STATES PATENT OFFICE 2,289,259

CARRIAGE FOR CUTTING OR SAWING MACHINES

Wallace W. Gardner and Ewald Schutz, Lancaster, Pa., assignors to De Walt Products Corporation, Lancaster, Pa., a corporation of Pennsylvania Application June 17, 1939, Serial No. 279,612

3 Claims. (Cl. 143—6)

This invention relates to carriages for cutting machines and more particularly to carriages for saws or cutters used in a woodworking machine.

An object of the present invention is to provide a new type of supporting mechanism for a cutter carriage which mechanism is simple and inexpensive to manufacture and which is more efficient in operation.

Another object of the invention is to provide a carriage structure made up of an arm having horizontally disposed channels therein for engagement by rollers attached to a carriage and shaped to fit in the channels.

Another object of the invention is to provide V-walled channels in an arm to receive rollers mounted on vertical axes and having their surfaces profiled to fit the channels.

Another object of the invention is to provide an arrangement whereby wear can be compensated for by adjusting the position of certain of the rollers to thereby vary the distance between the adjustable rollers and other fixed rollers.

A further object of the invention is to provide novel clamping means for holding a carriage in any desired position.

A further object of the invention is to provide in a carriage having a motor carrier or yoke pivotally secured thereto, an arrangement for positively determining certain angular positions of the yoke relative to the carriage.

An additional object of the invention is to provide means whereby the positioning elements are operative only under certain specified conditions.

A still further object of the invention is to provide bumper arrangements on a carriage to deaden the shock of impact between the carriage and other parts of the machine.

In carrying out the foregoing and other objects of the invention, a machine embodying the same is made up of a base, an upstanding elevator column and a carriage arm pivotally secured to the top of the elevator column. Inasmuch as the present invention relates only to details of construction of the carriage, illustration is not made herein of the base and elevator column and of the full length of the carriage arm. These parts of the machine may be of conventional character or may be of the character disclosed in the copending application of Wallace W. Gardner, Serial Number 279,611. The arm of the present invention is made of a suitable metal and in cross-section it is shaped so that a rounded top is provided joining two substantially parallel side walls. The lower end portions of these side walls are thickened and are provided in their inner faces with channels cut therein. The channels are V-walled, or in other words, are in the shapes substantially of a truncated V.

Associated with the arm is a carriage made up of a body having pivotally mounted on the top thereof two pairs of rollers. These rollers are mounted on vertical axes and comprise antifriction constructions with the outer faces of the outer races thereof profiled to fit in the V-walled channels. The rollers of one pair are mounted on fixed vertical axes while the rollers of the other pair are mounted on stub shafts having eccentric surfaces. Due to this arrangement, it is possible to vary the distance between the fixed pair of rollers and the adjustable pair of rollers so that compensation may be made for wear in the machine.

A motor carrying yoke or hanger is pivotally supported by the carriage body being connected thereto by a king-pin in connection with which provision is made for adjusting the relation between the pin and the other parts so that the yoke can be locked to the carriage body. To this end the nut holding the yoke in assembly with the king-pin has a lever-like extension or handle which permits manual tightening of the bolt on the pin to lock the parts together. In addition, the yoke is provided with three openings in the upper surface thereof, at spaced intervals of substantially 90°. The carriage body has a plunger secured thereto, which plunger has its lower end shaped to fit in the holes in the yoke to thereby definitely position the yoke in a desired angular relation to the carriage. The operating part of such pin includes a housing having an extension which slides under the arm of the machine to normally prevent lifting of the plunger out of engagement with a selected hole unless this extension is in alignment with a recess cut in the arm wall. The yoke has two depending arms between the lower ends of which a motor is pivotally secured on a horizontal axis. One motor trunnion is provided with a flange part having three conical shaped holes therein at spaced intervals of 90° and a fourth similarly shaped hole between two of the first holes and spaced from each of these at angles of 45°. The yoke has a spring pressed plunger, the end of which is shaped to fit in a selected one of the holes so that certain positions of the motor relative to the yoke can quickly be attained. The other trunnion of the motor is mounted in a bearing ring which may be said to be of floating type, in that the position of this ring relative to an opening in the yoke arm can be varied by adjustment of three set screws so that perfect alignment of the two trunnions can be obtained.

The ends of the carriage body have secured thereto bumpers made of rubber or some other suitable material having the necessary characteristics, which bumpers serve the purpose of absorbing any shocks which might be occasioned by contact between the carriage and other parts of the machine. The carriage body has a locking member secured thereto in the nature of a C clamp, one hook portion of which is profiled to fit in one of the channels of the arm and be frictionally held therein by a screw-threaded pressure member bearing against the outside of the arm.

Other features, objects and advantages of the invention will be apparent by reference to the following detailed description read in the light of the accompanying drawings wherein:

Fig. 1 is a vertical section through an arm and a carriage associated therewith and illustrating the latch mechanism for adjusting the yoke relative to the carriage body;

Fig. 2 is a plan view of the carriage;

Fig. 3 is a section taken substantially on the line 3—3 of Fig. 2;

Fig. 4 is an end view of the rear trunnion used in mounting the motor in the yoke;

Fig. 5 is a section taken substantially on the line 5—5 of Fig. 4;

Fig. 6 is a vertical section through the front trunnion of the motor showing the manner in which it is mounted in the lower end of one yoke arm, and Fig. 7 is a section taken substantially on the line 7—7 of Fig. 6.

Referring now to the drawings and particularly to Fig. 1, 10 indicates generally an arm of a cutting machine which arm may be of any desired length. The arm has a cross-section of such shape that the top thereof is rounded as shown at 11 and serves to connect the side walls 12. These side walls have their lower portions thickened as at 14 and V-walled channels 15 are cut in the inner surface of the thickened parts of the walls.

In connection with an arm so formed, use is made of a carriage body indicated generally at 16, such body being made up of a horizontal portion 17 and a vertical portion 18. The body 16 is provided with a pair of apertures 19 (see Figs. 2 and 3) for the passage of shafts 20, each of which has an enlargement 21 concentric with the part 20 near the top thereof. This enlargement 21 overlies the top of the vertical part 18 of the body and in turn has a flange portion 22 provided with diametrically opposite flats 24. The body is provided with a coaxial recess 25 to receive a lock washer 26 and a nut 27 surrounding the threaded end of the shaft 20. Fitting around the concentric enlargement 21 is an antifriction roller arrangement 33 made up of a race 28, ball bearings 29 and an outer race 30. The inner race 28 is locked in non-rotative position by tightening nut 27 against the lock washer 26, thereby drawing the flange 22 against the inner race and holding it between the flange and the top of the portion 18. The outer race 30 has tapered walls or edge parts 31 inclined at the same angle as the walls of the V-shaped channel 15 in the arm. In other words, the outer races are profiled to fit exactly in the V-walled channel 15.

The body 16 is also provided with a pair of through openings 35 for the passage of shafts 36, each of which has an enlarged head part 37, the periphery of which is eccentric relative to the shaft part 36. Again each shaft 36 is provided with a top flange 38, having diametrically opposite flats 39. The lower end of the shaft 36 is threaded to receive a nut 40 which can compress lock washer 41 to thereby lock the inner race 42 of a roller arrangement 44 between the flange 38 and the top of the part 18. The arrangement 44, as in the arrangement 33 is made up of the inner race 42, ball bearings 45 and an outer race 46 having tapered edge portions 47. The outer races 46 have their tapered surfaces 47 at such angles as to cause these races to fit perfectly in one of the channels 15. In each of the roller assemblies, lubrication is sealed in such fashion that the ball bearings require no attention. In addition to using the lock washer 41 and the nut 40 for locking the shaft 36 and the roller 44 assembled any desired position, use may also be made of a headless screw 48 extending through a threaded aperture in the body into contact with the shaft part 36. A lock washer 49 and a nut 50 fit on the end of the headless screw 48 to lock this screw in any adjusted position wherein the screw acts as a set screw.

The purpose of the eccentric enlargement or head 37 on shaft 36 is to make possible adjustment of the rollers 44 mounted on these eccentric parts 37 to compensate for wear in the contacting parts of the machine and also to make possible proper positioning of the two pairs of rollers in the two channels 15. By rotation of shaft 36 in its through opening 35, it is possible to cause the roller mounted on a part 37 to move either closer to, or further from, a longitudinal median line of the carriage. Thus, it is assured that the carriage can be mounted for true movement relative to the arm without any side sway or end play thereof and that this true mounting can be maintained for the life of the machine by simply adjusting the two rollers 44, and locking them in adjusted position by the two locking agencies shown and described herein.

The carriage body 16 has a through bore and a counterbore to receive a shouldered king-pin 50 which extends below the bottom of the body 16 and through an opening in a yoke member indicated generally at 51. The lower end of the king-pin 50 is threaded for the reception of a nut 52 which has an extension 54 forming a handle. A fragment of this handle is shown in Fig. 1. King-pin 50 is provided with a plurality of grooves 55 extending longitudinally thereof and at spaced intervals therearound. These grooves are designed to receive the end of a headed set screw 56 which passes through a suitable threaded aperture in the yoke 51. The bottom of king-pin 50 is slotted as at 57 so that this king-pin can be rotated by a suitable tool such as a screw driver while the nut 52 is held stationary, it being understood, of course, that the set screw 56 must be withdrawn for such rotation. In this manner, the yoke 51 can be drawn up against the bottom surface of the body 16 into a close fit therewith, whereby when the king-pin has been locked against rotation relative to the yoke by engagement of set screw 56 in one of the slots 55, it is possible to lock the yoke to the body 16 or unlock the same by a small angular movement of handle 54.

Yoke 51 has three salient portions 58 in each of which a hole 59 having conical walls is formed. These holes 59 are spaced at intervals of 90° relative to the axis of the king-pin 50. A part of the body 16 has a square through opening therein in which is mounted a shell 60 of square external shape and having a circular bore. This shell 60 is locked in the opening in the body by a set screw 61. Slidably mounted in the bore of shell 60 is a plunger 62 having a tapered end part 64 shaped to fit in any of the holes 59. The plunger also has a part 65 of reduced diameter extending through a suitable opening in the top of shell 60. A spring 66 surrounds the part 65 and acts to normally force the plunger downwardly. To the stem 67 of the plunger is secured a square housing 68, one edge of which is provided with a lateral extension 69 positioned to normally underlie the lower edge of one of the side walls 12 of the arm 10. A knurled head member 70 is fastened to the top of stem 67. Due to the lateral extension 69, the plunger 62 cannot be elevated an amount sufficient to withdraw the end 64 completely from a hole 59 unless the carriage is in such position that the extension 69 is in vertical alignment with a recess 71 cut in the side wall of arm 10 at one end thereof. The purpose of the arrangement just described is to make possible a quick positioning of the yoke 51 which serves to support a motor and cutting element in any one of three angular positions relative to the carriage and hence to the arm 10. These three selected positions are at intervals of 90°. Also the provision of the extension 69 makes it impossible for the yoke to shift from its preselected position unless the carriage has been moved to one end of the arm in which position extension 69 is in alignment with the recess 71 and can be then lifted to the dot-dash position of Fig. 1, thereby permitting the yoke to be rotated to any one of the three angular positions determined by the holes 59 or to any other desired angular position. It is to be undersood that the yoke can be locked in any desired angular position by use of the handle 54 in the manner before explained.

In order that the carriage can be locked in any desired position longitudinally of arm 10, use is made of a C clamp 75 (Figs. 1 and 2) positioned in a suitable opening 76 formed in the top of carriage body 16. The clamp 75 is mounted on a pin 77 passing through bosses 78 in the carriage body. One end of the C clamp 75 has tapered edges 73 of such angularity as to cause them to fit the tapered or V-walled channel 15. Another part of clamp 75 is provided with a horizontal threaded opening for the reception of a screw member 79 having a shoe 80 at one end thereof and a knurled knob 81 on the other end thereof. When the carriage has been moved to the desired position longitudinally of arm 10, it can be locked in this position by rotation of the screw 79, forcing the shoe 80 against the exterior of wall 12 and thereby drawing the tapered wall 78 into intimate contact with the walls of channel 15.

The yoke 51 has two yoke arms, namely, a front arm 85 and a rear arm 86, fragments only of which are shown in Figs. 4, 5 and 6. These arms depend from the top part of the yoke and are spaced apart an amount sufficient to receive therebetween an electric motor shown partially at 87 which serves to drive the saw or cutter elements used in this machine. The front yoke 85 has an enlarged circular aperture therein to receive a trunnion member 88 therein. This part of the yoke may be split if desired and clamping mechanism of conventional character associated therewith for causing the split ring part to be contracted on the trunnion to hold the same substantially immovable. The trunnion, in addition to the part 88 mounted directly in the yoke aperture, has a flange part 88' bearing against a part of the inner surface of yoke arm 85. The entire trunnion is secured to the motor casing 87 by a central shoulder screw 89 and by three spaced positioning screws 90. A thin plate 91 is fastened to the front of the trunnion and may have legendary matter thereon if desired. The shoulder part 88' is provided with three conical holes 92 spaced apart at intervals of 90° and with a similar hole 94 located midway between two of the holes 92. The arm 85 has a through opening 95 therein and a plunger 96 is slidably mounted in this opening. The end 97 of the plunger is tapered to fit any of the holes 92 or 94. A spring 98 surrounds the stem 99 of the plunger and is held under suitable compression by a split threaded plug 100. The stem terminates in a knurled knob 101. Since the holes 92, as before stated, are at intervals of 90°, it follows that the plunger 96 can be used in association therewith to selectively position the motor housing at any one of three angular positions relative to the hanger, which positions are 90° apart. If it is desired to utilize the hole 94, it follows that this position will be at an angle of 45° relative to a position determined by either one of the adjacent holes 92. It is to be understood that other angular positions of the motor relative to the hanger can be attained without using the plunger and hole arrangement since it is possible to shift the motor about its axis to any position and to clamp it in such position by the clamping mechanism (not shown, as before mentioned).

The rear yoke arm 86 is provided with a circular aperture 102 in which is mounted a ring 104, held in place by three set screws 105 threaded through the material of the yoke. Rotatably fitting within the ring 104 is a shoulder screw 106 threaded into a part of the motor housing 87. The purpose of the spaced ring 104 is to permit this ring and consequently the screw 106 to be brought into exact alignment with the trunnion 88 so that the motor can be rotated freely.

Referring again to Fig. 2, the carriage body 16 is shown as being provided with a rear bumper member 110 and a front bumper member 111. These members are made of rubber or any other suitable cushioning material and are so located that they will prevent metallic parts of the carriage from striking parts of the arm or other parts of the machine in use so that danger of breakage is substantially eliminated.

The operation of the various parts of the machine will be evident from the detailed description thereof and hence it is believed that further explanation is not required. It is to be understood that the invention can be modified and therefore it is not to be limited to the illustrated embodiment but is to be limited only by the scope of the following claims.

We claim:

1. A machine of the type described comprising a horizontally extending arm made up of a top connecting vertically extending side walls, the inner side walls being provided with V-walled channels, a carriage mounted for longitudinal movement relative to said arm, said carriage being provided with rollers rotatably secured thereto and each having sloping upper and lower surfaces to engage the flat sloping upper and lower surfaces of said channels, and a clamp member mounted on said carriage, said clamp member having a part provided with flat sloping upper and lower surfaces to engage the flat sloping upper and lower surfaces of one of said channels and a pressure applying part to engage the outer surface of one of said side walls.

2. In a machine of the type described comprising a horizontally extending arm, a carriage movable longitudinally of said arm, a yoke member pivotally secured to said carriage on a vertical axis, the improvement which comprises said carriage being provided with a spring pressed locking plunger, said yoke being provided with holes to receive the plunger, said holes being spaced at predetermined angular positions relative to the axis of rotation of said yoke, and a lateral extension from said plunger underlying a wall of said arm during the major part of the path of travel of said carriage to prevent lifting of said plunger.

3. In a machine of the type described comprising a horizontally extending arm, a carriage movable longitudinally of said arm, a yoke member pivotally secured to said carriage on a vertical axis, the improvement which comprises said carriage being provided with a vertically movable plunger, said yoke being provided with holes to receive the plunger, said holes being spaced at predetermined angular positions relative to the axis of rotation of said yoke, an extension from said plunger normally underlying a wall of said arm, said wall having a recess therein at one end thereof to receive said extension whereby the plunger can be lifted to disengage it from one of said holes.

WALLACE W. GARDNER.
EWALD SCHUTZ.